US012134933B1

(12) United States Patent
Johnston

(10) Patent No.: US 12,134,933 B1
(45) Date of Patent: *Nov. 5, 2024

(54) SMART DOOR WITH CONTROLLABLE ACCESS PANEL

(71) Applicant: Christopher Andrew Johnston, Chicago, IL (US)

(72) Inventor: Christopher Andrew Johnston, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,097

(22) Filed: Aug. 11, 2023

Related U.S. Application Data

(63) Continuation of application No. 17/734,452, filed on May 2, 2022, now Pat. No. 11,767,710, which is a continuation of application No. 16/712,318, filed on Dec. 12, 2019, now Pat. No. 11,346,150.

(60) Provisional application No. 62/788,215, filed on Jan. 4, 2019, provisional application No. 62/788,042, filed on Jan. 3, 2019.

(51) Int. Cl.

| | |
|---|---|
| ***E06B 7/32*** | (2006.01) |
| ***A47G 29/14*** | (2006.01) |
| ***A47G 29/28*** | (2006.01) |
| *A47G 29/30* | (2006.01) |

(52) U.S. Cl.
CPC .............. *E06B 7/32* (2013.01); *A47G 29/141* (2013.01); *A47G 29/28* (2013.01); *A47G 2029/143* (2013.01); *A47G 29/30* (2013.01)

(58) Field of Classification Search
CPC ........ A47G 29/28; A47G 29/30; A47G 29/22; A47G 29/141; A47G 29/16; A47G 2029/143; A47G 2029/145; A47G 2029/148; A47G 2029/149; E06B 7/28; E06B 7/32; E05G 7/00; E05B 37/0082; E05B 65/00; E05B 65/0075; G07C 9/00912; G07C 9/00896; B65G 11/023; B65G 11/04
See application file for complete search history.

(56) References Cited

U.S. PATENT DOCUMENTS

| | | | | |
|---|---|---|---|---|
| 7,815,112 | B2 | 10/2010 | Volpe et al. | |
| 9,504,344 | B2 * | 11/2016 | Sarvestani | A47G 29/1201 |
| 9,619,955 | B2 | 4/2017 | Eichenblatt | |
| 9,745,130 | B1 * | 8/2017 | Rawal | G06Q 10/0875 |
| 9,926,737 | B2 | 3/2018 | Wanjohi | |

(Continued)

*Primary Examiner* — William L Miller
(74) *Attorney, Agent, or Firm* — Goldstein Law Offices, P.C.

(57) ABSTRACT

A smart door control system for securely receiving a delivery item and controlling access between an interior space and an exterior space, the system comprising a smart door with an access opening and a movable access panel which selectively blocks or permits passage through the access opening. The smart door further has a control module adapted to receive delivery data identifying one or more authorized items, and a scanning device adapted to read a delivery identifier found on the delivery item. The smart door is adapted to reveal the access opening upon the delivery item being matched with one of the authorized items. The access panel is adapted to variably control the size of the access opening in proportion to the dimensions of the delivery item. The system further comprises a user device allowing a user to remotely receive status alerts from the smart door and issue user commands.

15 Claims, 17 Drawing Sheets

(56) References Cited

U.S. PATENT DOCUMENTS

| | | | | |
|---|---|---|---|---|
| 10,413,106 | B1 | 9/2019 | Valeriano et al. | |
| 10,512,351 | B1 | 12/2019 | Valeriano et al. | |
| 10,588,440 | B1 | 3/2020 | Kajgana | |
| 10,624,484 | B1 * | 4/2020 | Mountford | B60P 3/03 |
| 10,772,451 | B2 | 9/2020 | Vernal Silva et al. | |
| 10,808,449 | B1 * | 10/2020 | Goetz | G07C 9/00182 |
| 10,817,824 | B2 | 10/2020 | Richardson et al. | |
| 10,881,233 | B1 | 1/2021 | Walsh | |
| 10,888,189 | B2 * | 1/2021 | Pointeau | G06Q 10/08 |
| 11,085,234 | B2 | 8/2021 | Hunt | |
| 11,346,150 | B1 | 5/2022 | Johnston | |
| 11,369,223 | B2 | 6/2022 | Plummer | |
| 11,495,068 | B1 | 11/2022 | Valentine | |
| 11,534,015 | B2 * | 12/2022 | Janas | A47G 29/141 |
| 11,536,079 | B2 | 12/2022 | Schler | |
| 11,797,914 | B2 * | 10/2023 | Yamamoto | G06Q 10/0834 |
| 11,806,879 | B2 * | 11/2023 | Spurgeon | B25J 9/1669 |
| 11,832,751 | B2 * | 12/2023 | Gatke | A47G 29/16 |
| 11,839,319 | B1 * | 12/2023 | Parr | A47G 29/22 |
| 11,896,151 | B2 * | 2/2024 | Myrick | A47G 29/22 |
| 2002/0035857 | A1 | 3/2002 | Stein et al. | |
| 2002/0162883 | A1 | 11/2002 | Arvonio et al. | |
| 2003/0006275 | A1 | 1/2003 | Gray | |
| 2006/0010077 | A1 | 1/2006 | Dohrmann et al. | |
| 2013/0264381 | A1 * | 10/2013 | Kim | G07F 17/13 232/24 |
| 2013/0293074 | A1 | 11/2013 | Skouboe | |
| 2014/0190081 | A1 | 7/2014 | Wanjohi | |
| 2015/0120529 | A1 | 4/2015 | Faaborg | |
| 2016/0101874 | A1 | 4/2016 | McKinnon et al. | |
| 2016/0140496 | A1 | 5/2016 | Simms et al. | |
| 2016/0247344 | A1 | 8/2016 | Eichenblatt | |
| 2016/0374494 | A1 | 12/2016 | Geng | |
| 2017/0091710 | A1 | 3/2017 | Van Dyke | |
| 2017/0286905 | A1 | 10/2017 | Richardson et al. | |
| 2018/0080275 | A1 | 3/2018 | Borobio Munera et al. | |
| 2018/0101820 | A1 | 4/2018 | Peynet et al. | |
| 2018/0114256 | A1 | 4/2018 | Lee | |
| 2018/0228310 | A1 | 8/2018 | Enobakhare et al. | |
| 2019/0180544 | A1 | 6/2019 | Newcomb | |
| 2019/0231105 | A1 * | 8/2019 | Pointeau | G07C 9/00896 |
| 2019/0261802 | A1 | 8/2019 | Vernal et al. | |
| 2020/0035051 | A1 | 1/2020 | Kane | |
| 2020/0071991 | A1 | 3/2020 | Patel | |
| 2020/0308903 | A1 | 10/2020 | Anderson | |
| 2020/0352376 | A1 | 11/2020 | Vernal Silva et al. | |
| 2021/0005033 | A1 | 1/2021 | Roman et al. | |
| 2021/0038004 | A1 | 2/2021 | Grana Dominguez | |
| 2021/0059456 | A1 | 3/2021 | Fontanilla | |
| 2021/0079720 | A1 | 3/2021 | Hunt | |
| 2021/0082219 | A1 | 3/2021 | Kane | |
| 2021/0230926 | A1 | 7/2021 | Schler | |

* cited by examiner

SMART DOOR WITH CONTROLLABLE ACCESS PANEL

CROSS-REFERENCE TO RELATED APPLICATIONS

This application claims priority to patent application Ser. No. 17/734,452 filed in the United States Patent Office on May 2, 2022, which in turn claims priority to U.S. patent Ser. No. 11/346,150 filed in the United States Patent Office on Dec. 12, 2019. U.S. patent Ser. No. 11/346,150 claims priority to provisional patent application, Ser. No. 62/788,042 filed in the United States Patent Office on Jan. 3, 2019, and provisional patent application, Ser. No. 62/788,215 filed in the United States Patent Office on Jan. 4, 2019. The aforementioned patent and patent applications are expressly incorporated herein by reference in their entirety.

TECHNICAL FIELD

The present disclosure relates generally to a method and system for facilitating automated acceptance of authorized deliveries. More particularly, the present disclosure relates smart door with a movable access panel and access opening which allows authorized delivery items to be passed therethrough.

BACKGROUND

The secure and safe delivery of mail, packages, and other items has long been a concern for both businesses and homes, especially as consumers are turning to internet-based retailers for an ever increasing proportion of goods, groceries, and other items. Conventional mail slots are too small to allow the passage of packages, and deliveries are often left unattended when no one is available to receive them, thus creating a high risk of theft. Drop boxes and other large mail receptacles designed to receive packages are bulky, and homes are rarely equipped with them.

Various devices for automated or unattended receipt of mail and other delivered items can be found within the prior art. For example, doors equipped with trap doors or movable panels allow packages to be deposited into buildings, thus negating the need for a standalone drop box. Often, these doors require authentication through passcodes, biometrics, or other common security methods before the trap doors or panels can be accessed. However, these devices have several key disadvantages. Firstly, the reliance on general authentication does not permit the screening of specific items to ensure that only authorized packages are allowed to be deposited. Secondly, the trap doors must be sufficiently large to permit larger boxes to pass through, thus compromising the protective value of the door by presenting an unnecessarily large opening.

A need therefore exists for a door with an integrated opening for receiving deliveries which permits access only to authorized items, which is also capable of automatically varying the size of the opening in proportion to the dimensions of the items being delivered.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a smart door which allows delivery items to be securely delivered. Accordingly, the present disclosure provides a smart door having a main panel, a scanning device, an access opening, a movable access panel adapted to selectively cover or reveal the access opening, and a control module. The control module is operably connected to a delivery service device, such as an ecommerce platform server, and is adapted to receive delivery data identifying one or more authorized items. The scanning device scans an information tag disposed on each delivery item to obtain the delivery item identifier of the delivery item. If the delivery item identifier matches the delivery item identifier of one of the authorized items, the access panel will reveal the access opening, thus allowing the delivery item to be passed therethrough.

It is another aspect of an example embodiment in the present disclosure to provide a smart door which allows the access panel to minimize the size of the access opening while still allowing authorized delivery items to pass through. Accordingly, the present disclosure provides an access panel adapted to variably control an access opening height in proportion to a delivery item height. The delivery item height may be transmitted to the control module via the delivery data, or be encoded within the information tag. In certain embodiments, the scanning device may function as a dimensional scanner to automatically determine the delivery item height.

It is yet another aspect of an example embodiment in the present disclosure to allow a user to receive status updates from the smart door as well as manually control the access panel. Accordingly, the present disclosure provides a user device operably connected to the control module via the communication network, the user device is adapted to execute a control application which provides the user with access to user commands and status updates.

It is a further aspect of an example embodiment in the present disclosure to allow video to be captured for the purpose of identifying persons approaching the smart door, and to observe the access opening. Accordingly, the present disclosure provides a smart door with an external camera oriented towards an exterior space, and an interior camera positioned above the access opening, which is adapted to capture video of the delivery item or other objects which pass through the access opening.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
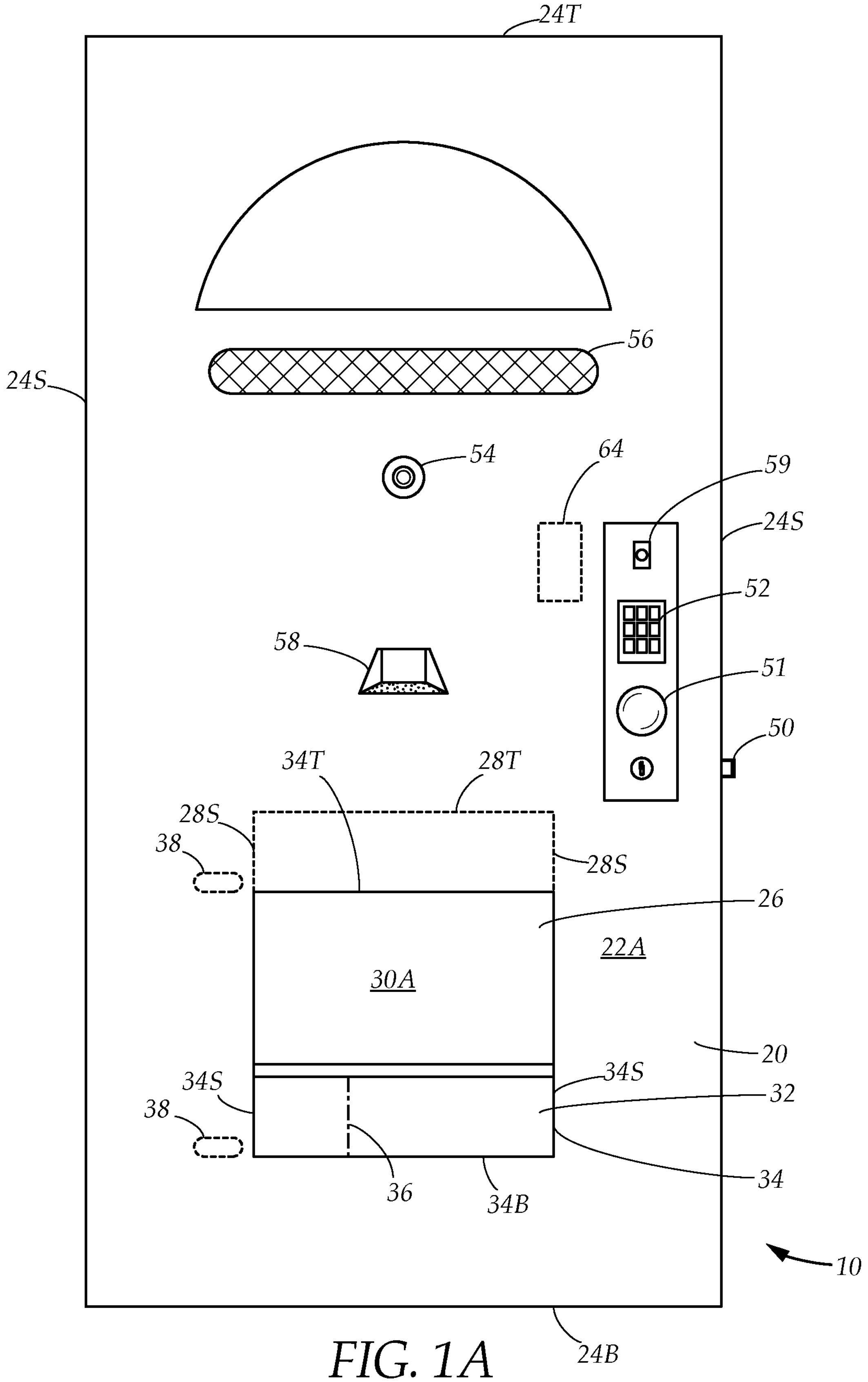
FIG. 1A is a diagrammatical front view of a smart door with an access panel adapted to reveal or cover an access opening, in accordance with an embodiment in the present disclosure.
Figure 2:
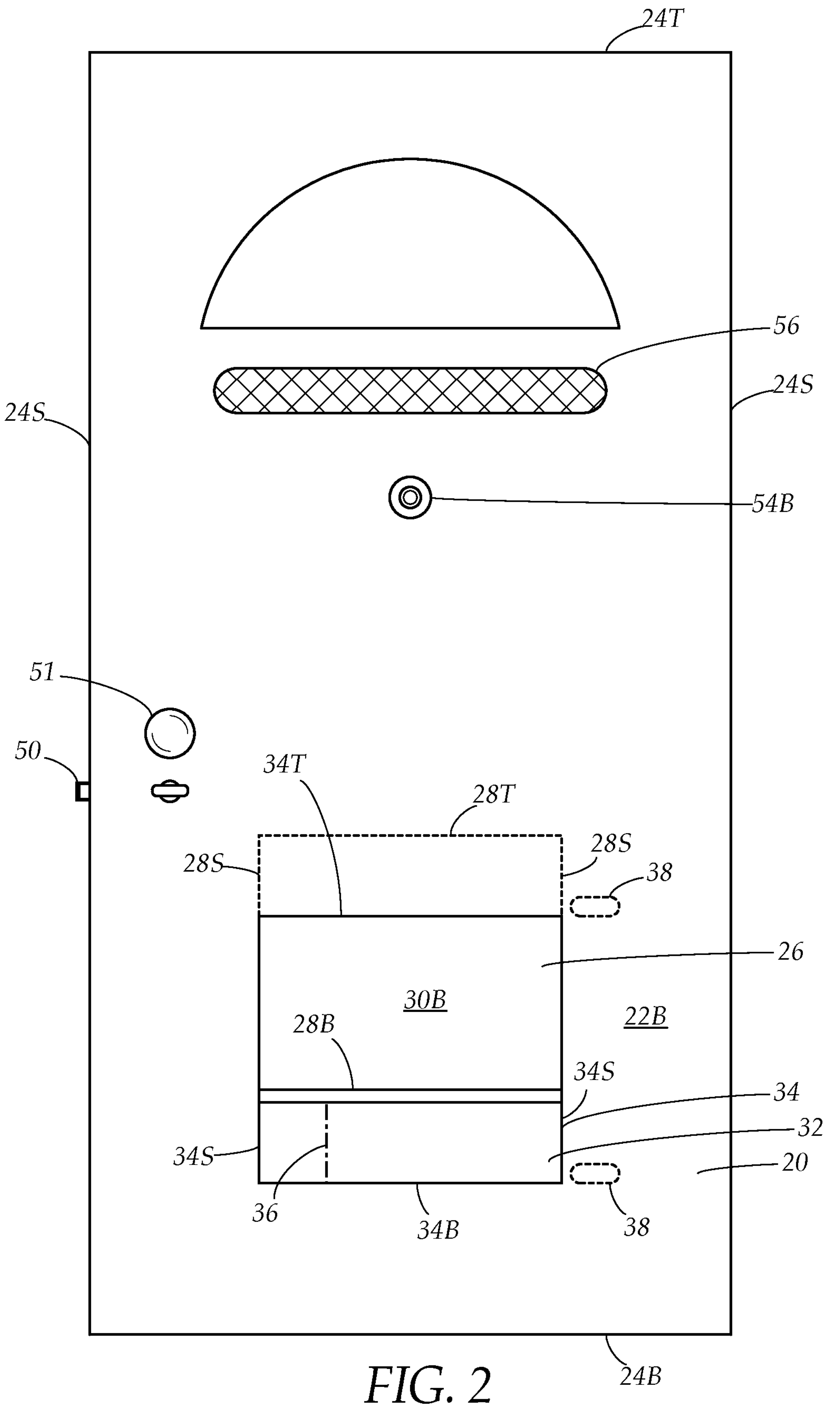
FIG. 2 is a diagrammatical rear view of the smart door, in accordance with an embodiment in the present disclosure.
Figure 3A:
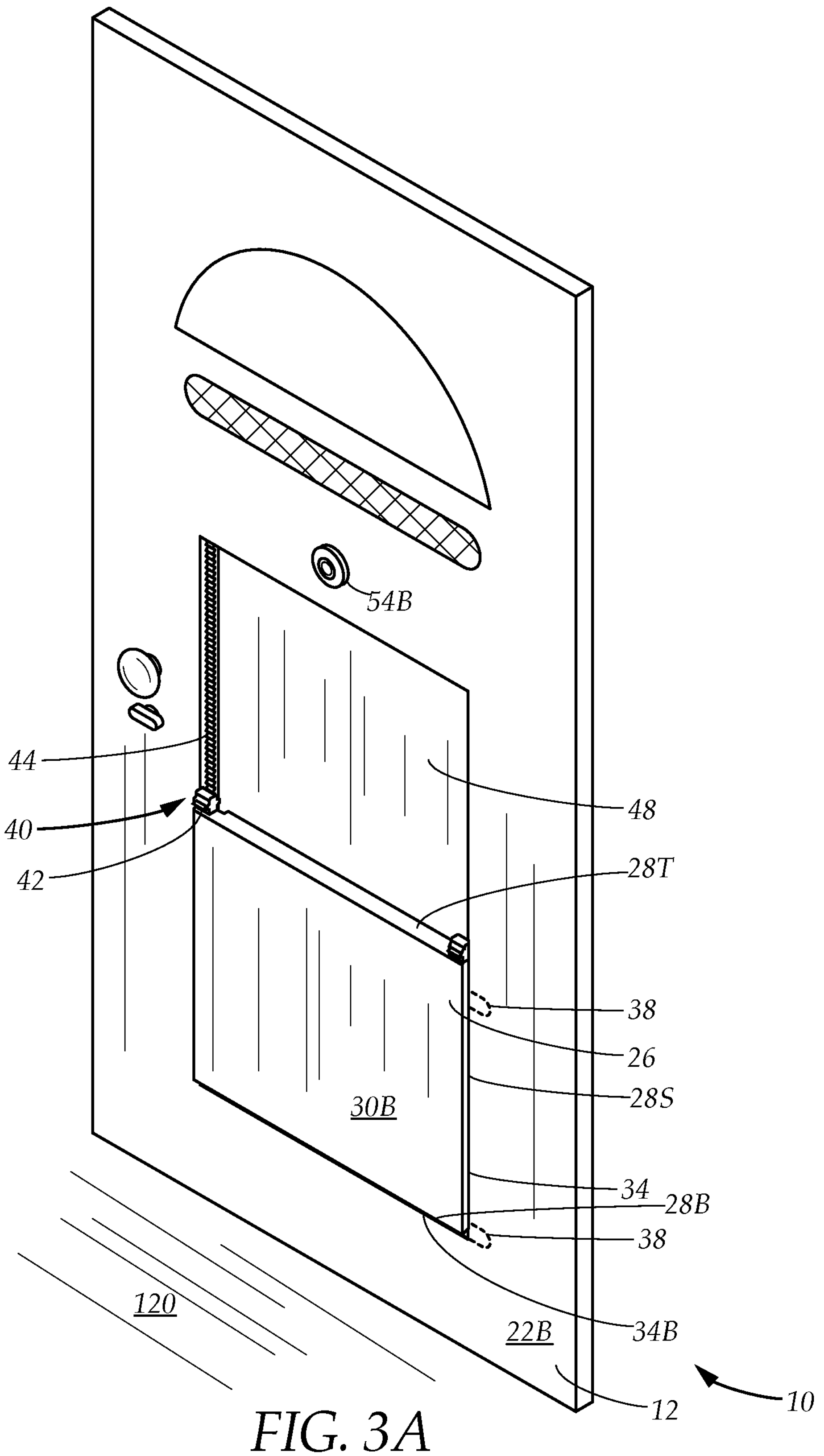
FIG. 3A is a diagrammatical perspective view of the smart door, showing the access panel in a closed position blocking the access opening, further showing a panel actuator for raising and lowering the access panel, in accordance with an embodiment in the present disclosure.
Figure 3B:
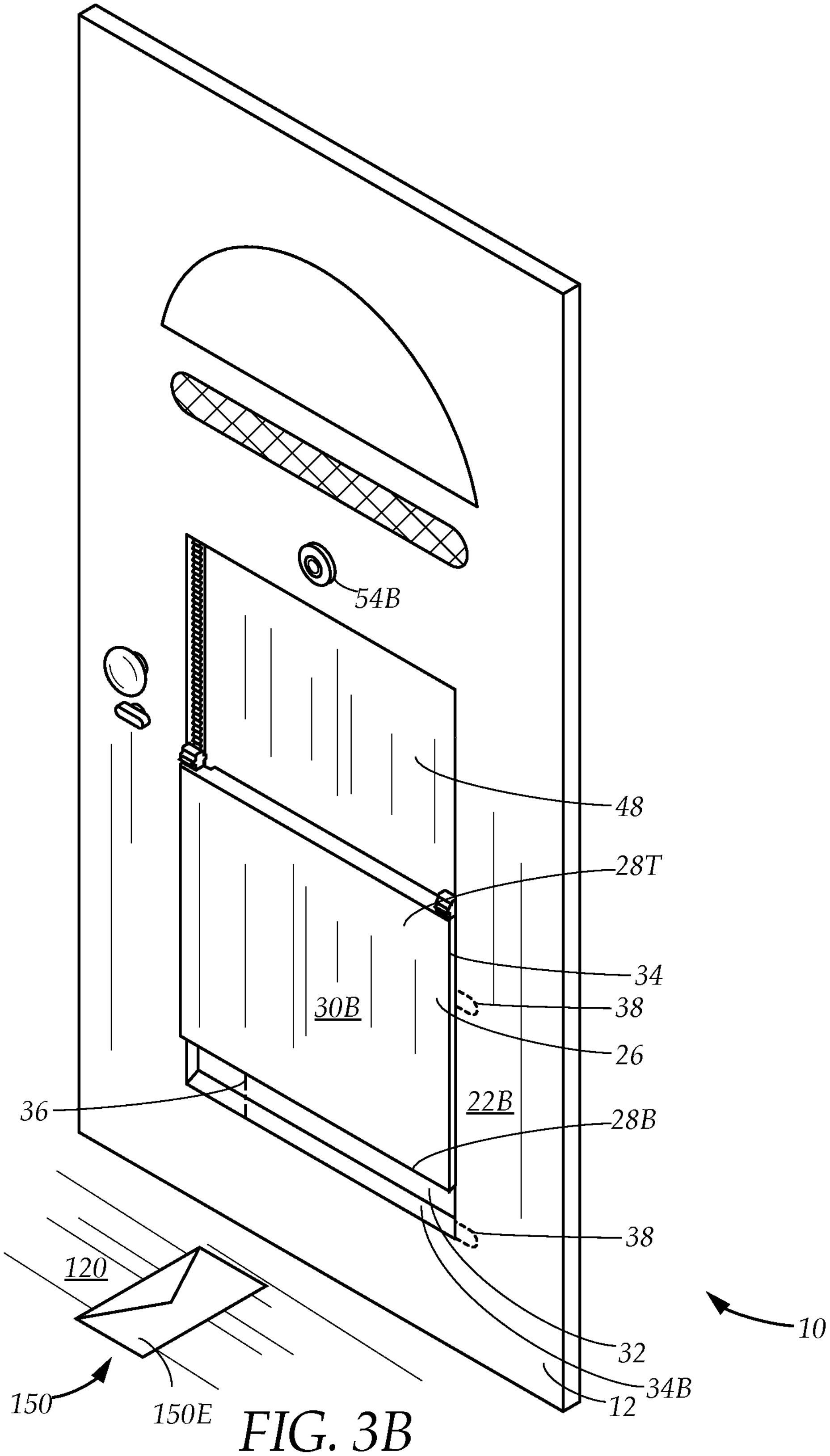
FIG. 3B is a diagrammatical perspective view of the smart door, showing the access panel raised sufficiently to allow an envelope to pass through the access opening, in accordance with an embodiment in the present disclosure.
Figure 3C:
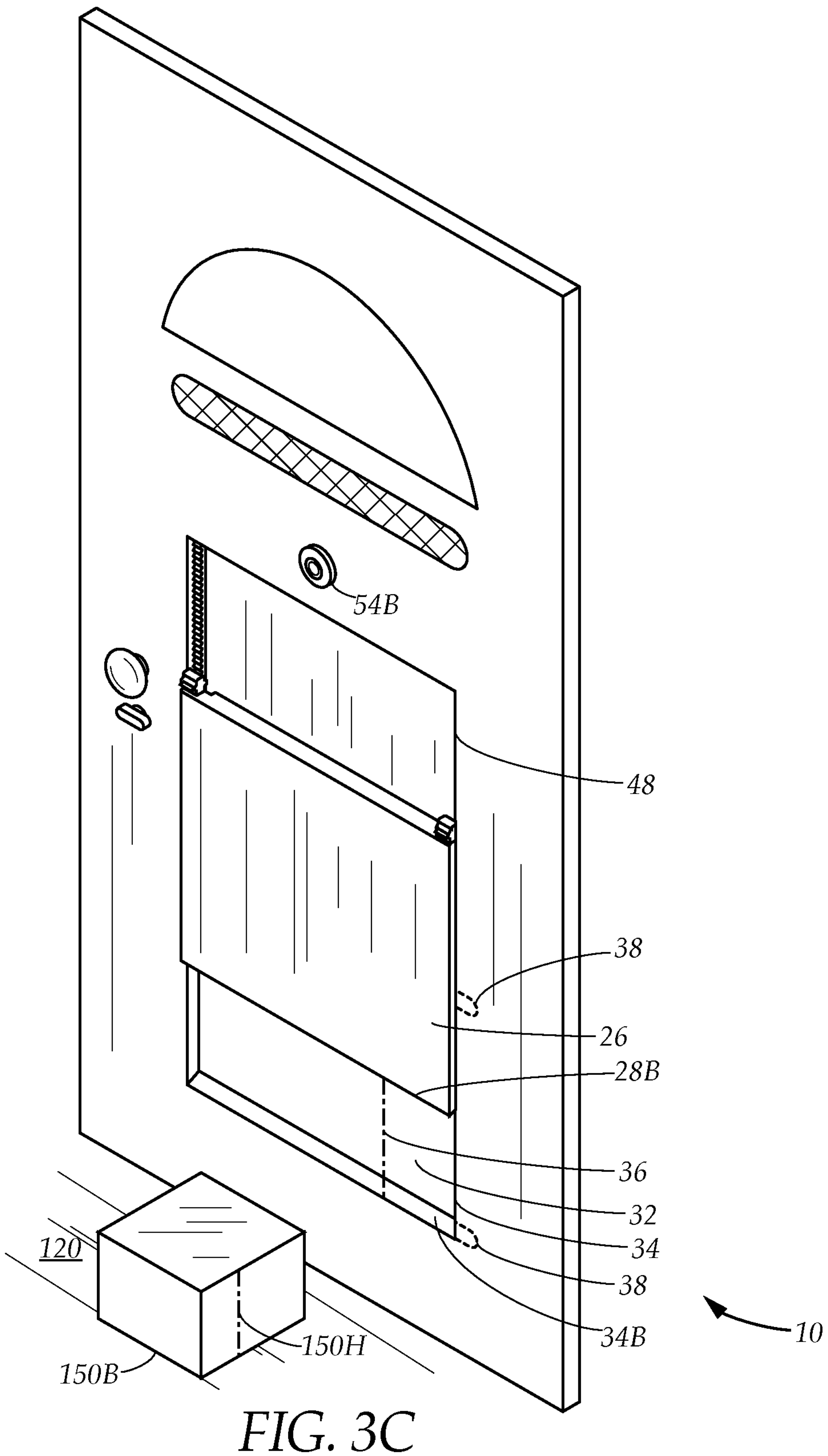
FIG. 3C is a diagrammatical perspective view of the smart door, showing the access panel raised sufficiently to allow a box to pass through the access opening, in accordance with an embodiment in the present disclosure.
Figure 3D:
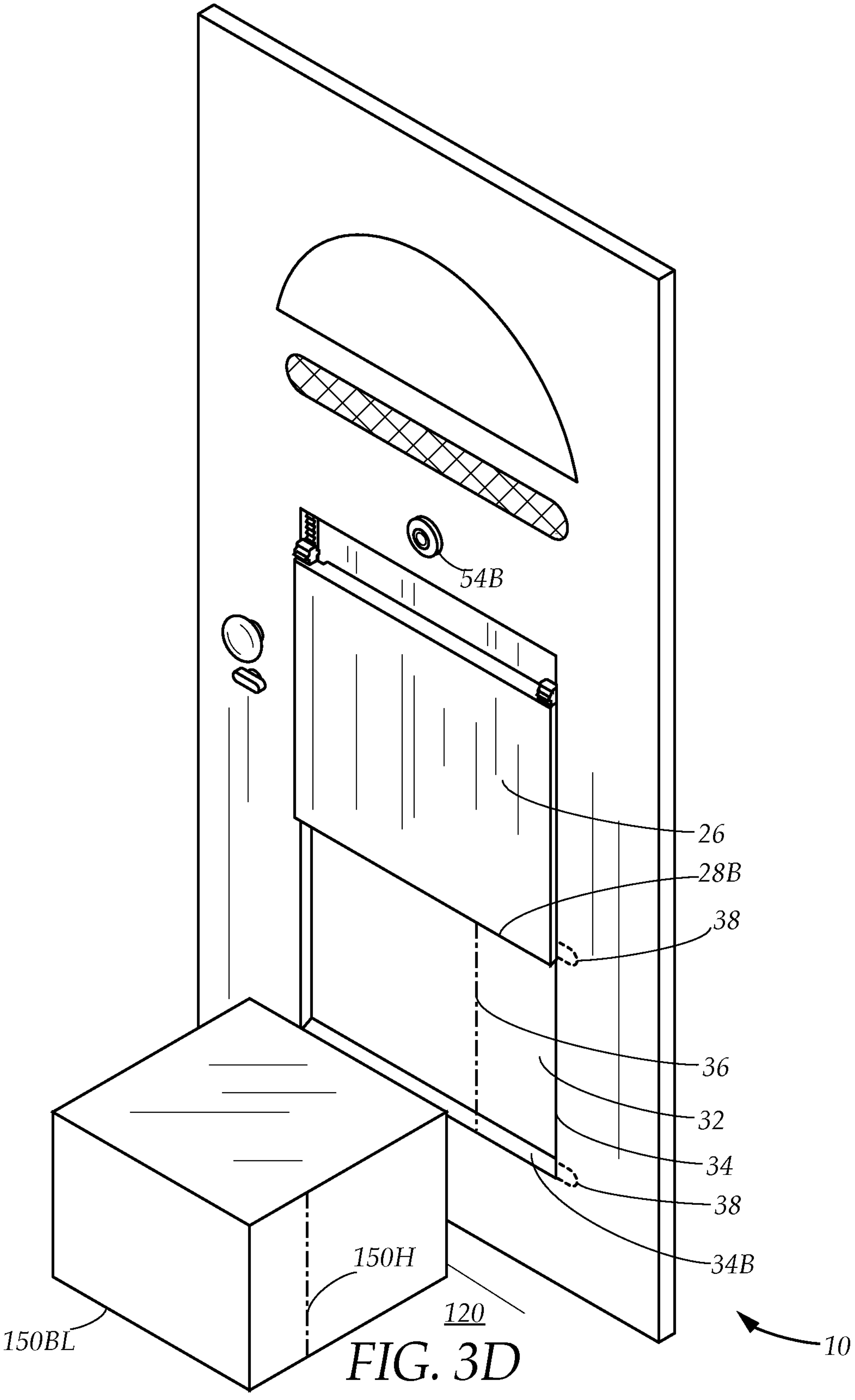
FIG. 3D is a is a diagrammatical perspective view of the smart door, showing the access panel raised sufficiently to allow a large box to pass through the access opening, in accordance with an embodiment in the present disclosure.
Figure 4:
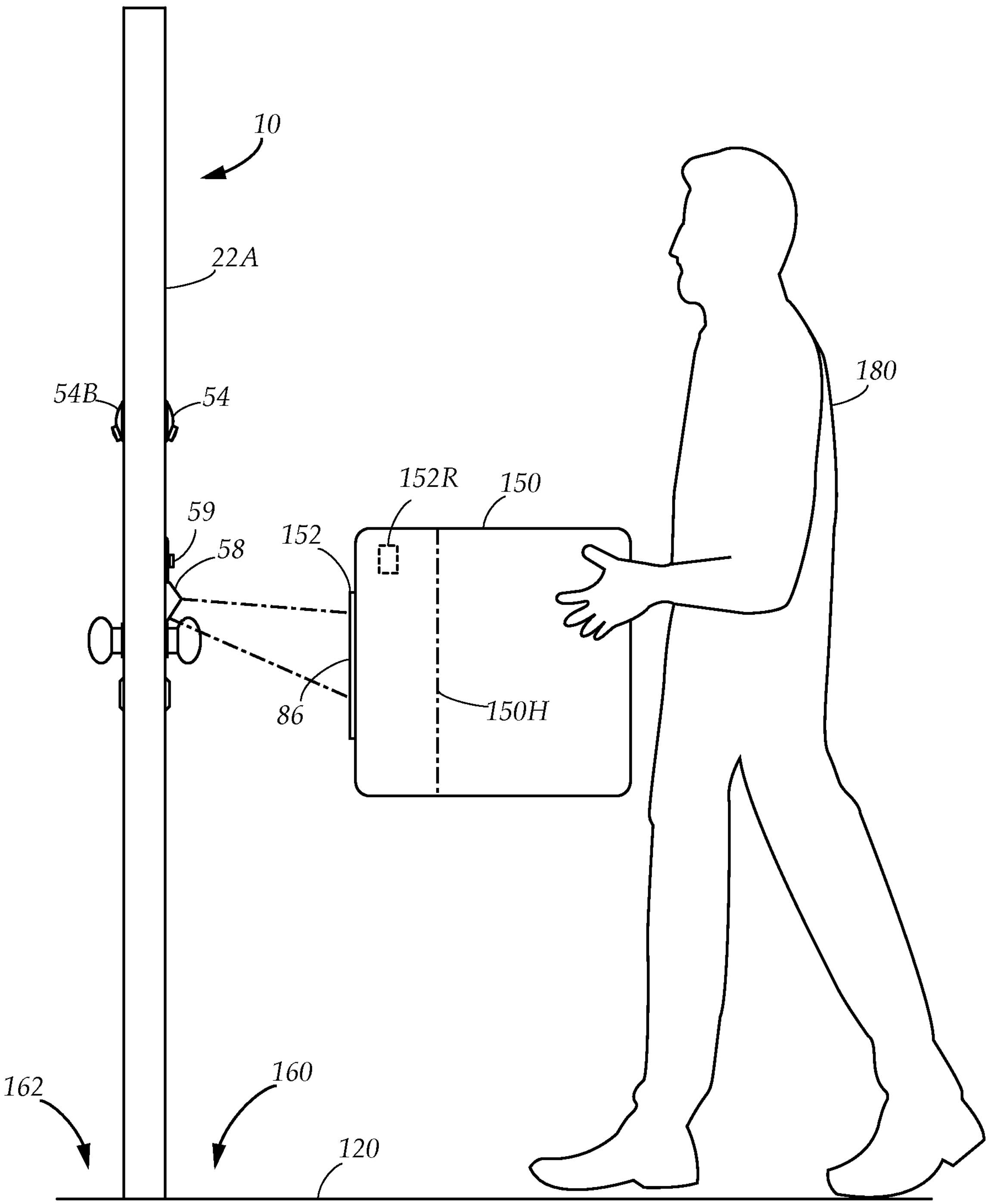
FIG. 4 is a diagrammatical side view of the smart door, showing a courier presenting the delivery item to a scanning device, in accordance with an embodiment in the present disclosure.

FIG. 1A and FIG. 2 illustrate a smart door 10 comprising a main panel 20 with an inner face 22B, an outer face 22A disposed opposite thereof, and an access opening 32 which passes through the main panel 20 between the inner and outer faces 22B, 22A. The smart door 10 is adapted to be positioned within a structure to form a barrier between an interior space 160 and an exterior space 162, as shown in FIG. 4. Continuing to refer to FIG. 1A and FIG. 2, the smart door may selectively open or close, thereby either allowing or preventing passage between the interior space and the exterior space. Referring to FIGS. 3A-3C, the access opening 32 allows objects, such as a delivery item 150, to pass between the interior space and the exterior space while the smart door 10 remains closed to protect the interior space, and the smart door 10 further comprises an access panel 26 which is adapted to selectively reveal or cover the access opening 32. Examples of delivery items 150 may include an envelope 150E, a box 150B, as well as various forms of packages, parcels, or other similar objects. Each delivery item 150 has a delivery item height 150H or thickness, and the access panel 26 is adapted to variably reveal the access opening 32 to accommodate the delivery item height 150H. To promote increased security, the smart door 10 may be adapted to only reveal enough of the access opening 32 to allow the delivery item 150 to pass through. The smart door 10 also comprises a lock mechanism 50 which can be selectively engaged to prevent the smart door 10 from being opened, one or more scanning devices 58 adapted to scan the delivery item 150, and a control module 64 through which the components and functions of the smart door 10 are controlled and implemented. The smart door 10 may also have a handle or doorknob 51 adapted to allow the smart door 10 to be opened, as well as an activation switch 59.

In a preferred embodiment, the smart door 10 further has an exterior camera 54 for capturing images and/or video of the external space, as well as an access input device 52, such as a keypad, adapted to allow inputting of access codes for disengaging the lock mechanism 50. The smart door 10 may also have a speaker 56 adapted to emit sounds, as well as a microphone for capturing sounds. Referring to FIG. 2 and FIG. 4, the smart door 10 may also have an interior camera 54B which is positioned to capture images and/or video of the interior space.

Figure 1B:
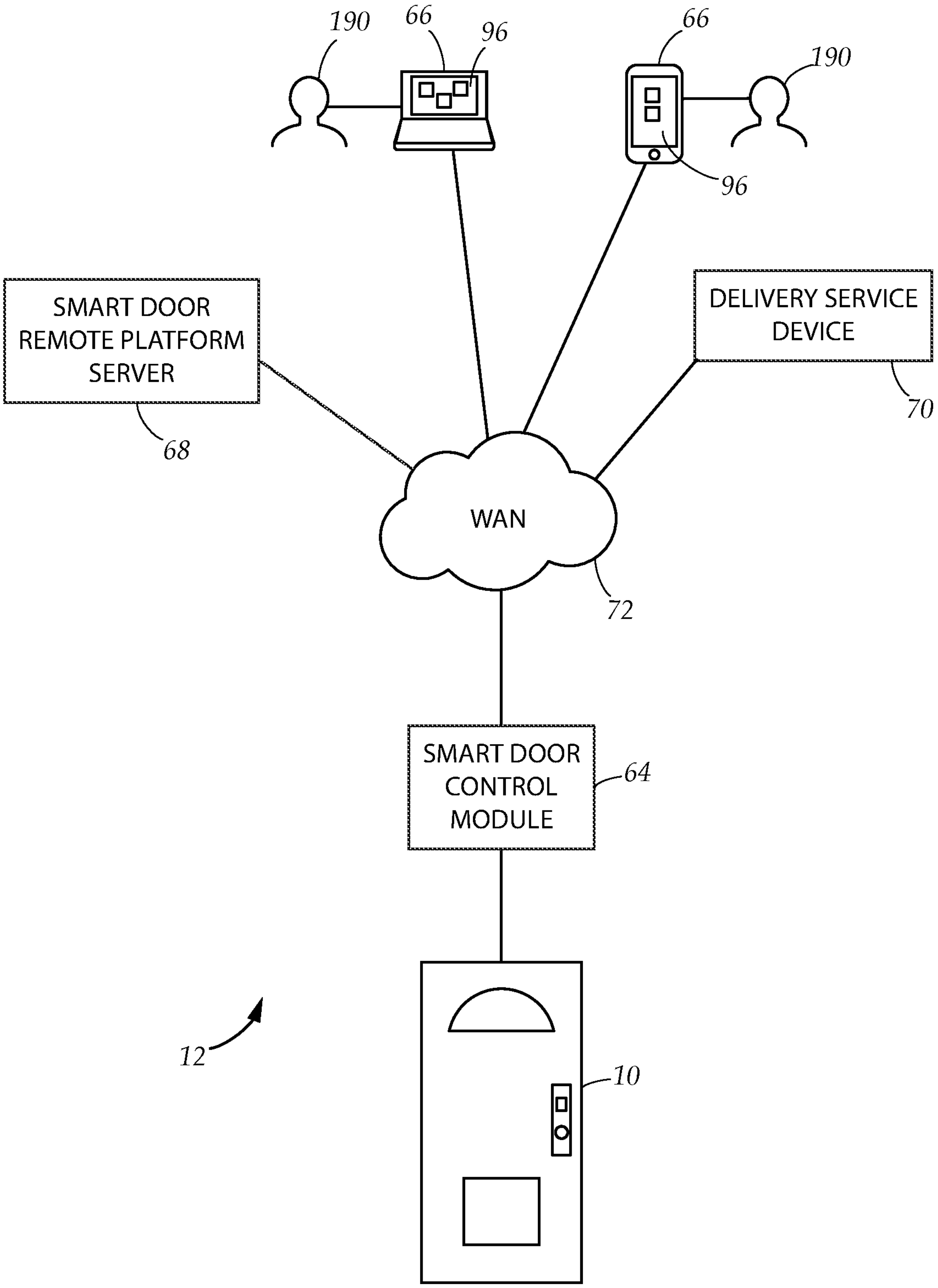
FIG. 1B is a block diagram depicting a smart door control system, in accordance with an embodiment in the present disclosure.

Referring to FIG. 1B while also referring to FIG. 1A, the smart door 10 may be integrated within a smart door control system 12 which enables a user 190 to access and control the smart door 10, such as by locking or unlocking the smart door 10 or revealing or covering the access opening 32 using the access panel 26. The smart door control system 12 may comprise a user device 66 and a smart door remote platform server 68 which are operably connected to the smart door 10 via a communication network 72 such as a wide area network (WAN) or the Internet. Referring to FIG. 4 while also referring to FIGS. 1A-B, the operation of the access panel 26 may be automated via the control module 64 and/or the smart door control system 12, thus allowing delivery items 150 to be received without manual input from the user. Furthermore, the smart door 10 may also be adapted to allow the access panel 26 to automatically reveal the access opening 32 only when the delivery items 150 have been authorized. As such, the remote platform server 68 may be further adapted to communicate via the communication network 72 with a delivery service device 70 operated by a courier service, post office, or any other service which handles and delivers the delivery item 150.

Referring to FIG. 1A, FIG. 2, and FIG. 3A, the main panel 20 has a top edge 24T, a bottom edge 24B, and a pair of side edges 24S extending therebetween. The main panel 20 is oriented perpendicularly in relation to a horizontal surface 120 such as a floor or ground surface, with the top edge 24T projecting away from the horizontal surface 120. The inner face 22B and the outer face 22A are oriented towards the interior and exterior spaces respectively. In a preferred embodiment, the access opening 32 is rectangular in shape and is positioned proximate to the bottom edge 24B of the main panel 20. The access opening 32 is defined by an access frame 34 which has an access frame top edge 34T, an access frame bottom edge 34B, and a pair of access frame side edges 34S extending therebetween. The exterior camera 54 may be positioned on the outer face 22A of the main panel 20, while the interior camera 54B may be positioned on the inner face 22B of the main panel 20 in a position above the access frame 34. The interior camera 54B may be pointed downward towards the access frame 34 and the horizontal surface 120, allowing the interior camera 54B to visually capture any objects which may pass through into the interior space.

In a preferred embodiment, the access panel 26 is oriented vertically and is parallel with the inner and outer faces 22A, 22B of the main panel 20. The access panel 26 is adapted to selectively cover or reveal the access opening 32 by sliding across the access frame 34. Referring to FIGS. 1A, FIG. 2, and FIGS. 3A-3C, the access panel 26 may be rectangular in shape, having an access panel bottom edge 28B, an access panel top edge 28T, and a pair of access panel side edges 28S extending therebetween, and has sufficient height and width to fully cover the access opening 32. The access panel 26 further has an access panel outer face 30A and an access panel inner face 30B. The access panel 26 begins in a closed position whereby the access opening 32 is fully covered by the access panel 26, and may be placed in an open position whereby the access panel 26 slides across the access frame 34 to reveal the access opening 32. The sliding motion of the access panel 26 may be facilitated using a panel actuator 40. In one embodiment, the panel actuator 40 may be a linear actuator, such as a motorized rack and pinion assembly having a gear 42 and a rack portion 44. The access opening 32 has an opening height 36 which may be increased or diminished by controlling the sliding motion of the access panel 26, thus allowing delivery items 150 of various sizes to pass through the access opening 32. The delivery item 150 has delivery item dimensions, such as height 150H or thickness. The smart door 10 is adapted to increase or diminish the opening height 36 in proportion to the delivery item dimensions.

In one embodiment, the access panel bottom edge 28B and the access panel top edge 28T are oriented towards the bottom edge 24B and top edge 24T of the main panel 20 respectively. The access panel 26 is adapted to slide vertically in relation to the access frame 34, with the access panel 26 sliding upwardly or downwardly to reveal or cover the access opening 32. The opening height 36 may correspond to the distance between the access panel bottom edge 28B, and the access frame bottom edge 34B. Note that in an alternate embodiment, the access panel 26 may instead be adapted to slide horizontally in either a rightward or leftward direction, and an opening width may be employed in place of the opening height. The opening width is sufficient to accommodate the width of the delivery item and may be measured as the distance between one of the access panel side edges 28S and the corresponding access frame side edge 34S.

In certain embodiments, the inner face 22B of the main panel 12 may have an actuation recess 48 positioned above the access frame 34, corresponding to a depressed or hollow space. The access panel 26 may be positioned towards the inner face 22B of the main panel, and the actuation recess 48 is adapted to receive the access panel 26 as it slides upwardly. The actuation recess 48 may alternatively be positioned between the inner and outer faces 22B, 22A of the main panel 20. By allowing the access panel 26 to partially nest within the actuation recess 48, the overall thickness of the smart door 10 may be reduced.

In one alternative embodiment, the access panel 26 may have a panel thickness which is less than the thickness of the main panel. The access panel 26 may be positioned approximately midway between the inner and outer faces 22B, 22A of the main panel 20, while the access frame top, bottom, and side edges 34T, 34B, 34S may remain flush with the inner and outer faces 22B, 22A. This configuration creates an ornamental sunken space between the access panel outer and inner face 30A, 30B and the outer and inner face 22A, 22B of the main panel 20.

Note that in alternate embodiments, the access frame 34 may be positioned at an alternate location in relation to the main panel 20. For example, the access frame bottom edge 34B may be omitted, and the access panel bottom edge 28B may instead abut against the horizontal surface 120 when the access panel 26 is in the closed position. In certain other embodiments, the panel actuator 40 may be substituted with a motorized hinged mechanism which allows the access panel 26 to be hingedly raised to reveal the access opening 32.

In a preferred embodiment, the smart door 10 further has one or more access panel sensors 38 positioned proximate or adjacent to the access frame 34 or the access panel 26. The access panel sensors 38 may be adapted to determine the position of the access panel 26 relative to the access frame 34, detect the magnitude of the opening height 36 by measuring the distance between the access panel bottom edge 28B and the access frame bottom edge 34B, and/or as determine whether a blockage is present within the access opening 32 which would obstruct the movement of the access panel 26. The access panel 26 may be prevented from closing when the access opening 32 is blocked in order to prevent the access panel 26 from damaging the delivery item 150 if it remains positioned within the access opening 32, and may further prevent injury to persons or animals. Various sensing technologies may be employed, as will be apparent to a person of ordinary skill in the art in the field of the invention.

The access panel sensors 38 may also be adapted to detect an attempt to force open the access panel, whereupon the control module 64 may be adapted to automatically alert emergency services of a potential break-in. The speaker 56 may also be adapted to emit a high volume alert tone or other audio signal.

Figure 5A:
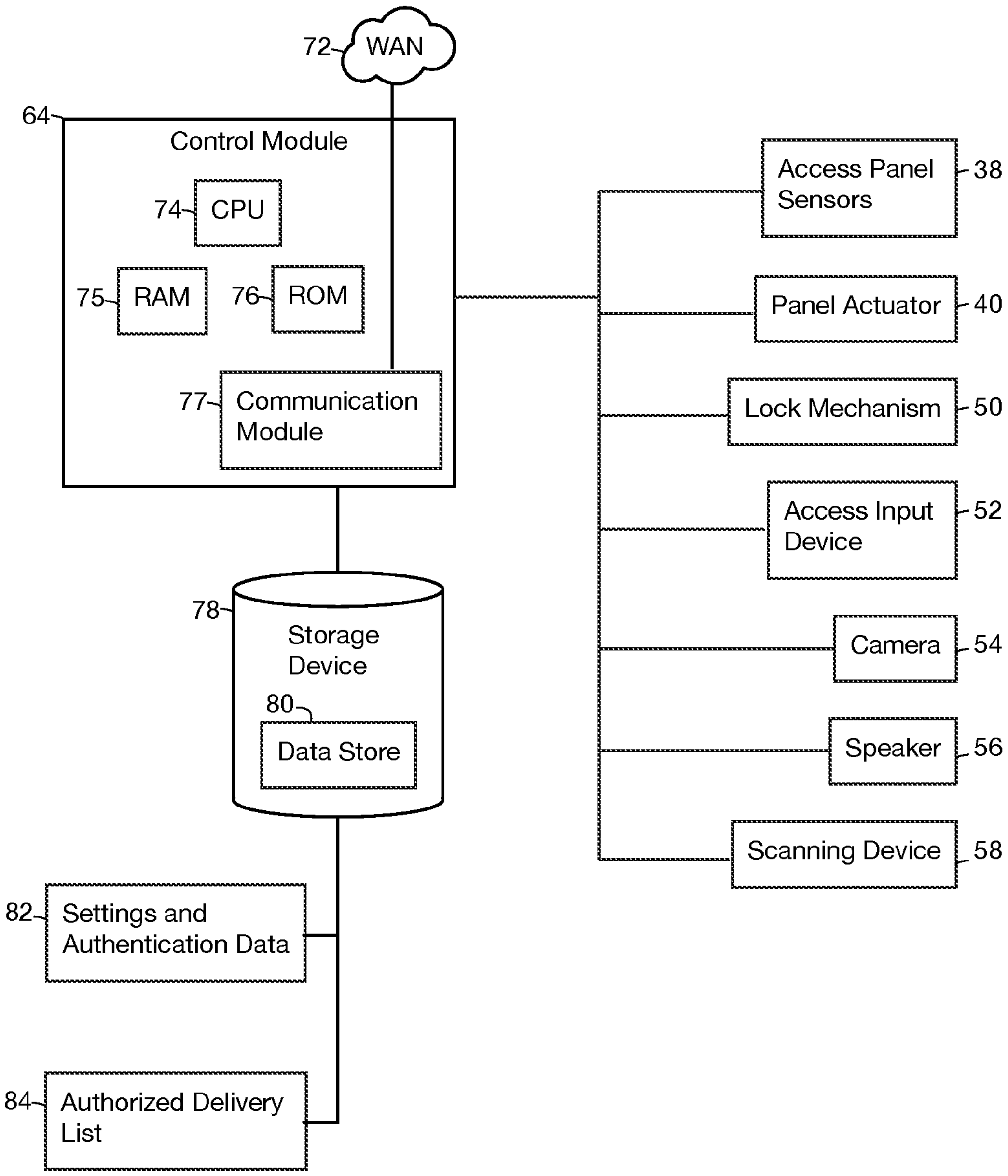
FIG. 5A is a block diagram, showing a control module operably linked to a plurality of smart door components, in accordance with an embodiment in the present disclosure.

Referring now to FIGS. 1A-B and FIG. 5A, the control module 64 is preferably attached to or positioned within the main panel 20 of the smart door 10, and may be implemented using a microcontroller or any similar computing device for controlling embedded systems which is known to persons of ordinary skill in the art in the field of the invention. In one embodiment, the control module 64 has a CPU 74, a RAM 75, and a ROM 76. The control module 64 is operably connected to each of the components of the smart door 10, including the lock mechanism 50, the panel actuator 40, access panel sensors 38, camera 54, access input device 52, scanning device 58, and speaker 56. The control module 64 further has a communication module 77 which may be either integrated within or operably connected to the control module 64, which is adapted to transmit and receive data through the communication network 72 via wireless communication protocols, thus allowing the control module 64 to communicate with the smart door control system 12. The communication module 77 may also be adapted to communicate via short ranged RF protocols such as Bluetooth or Wi-Fi. The control module 64 may further have a storage device 78 adapted to allow local storage of data necessary for the operation of the smart door 10.

Figure 5B:
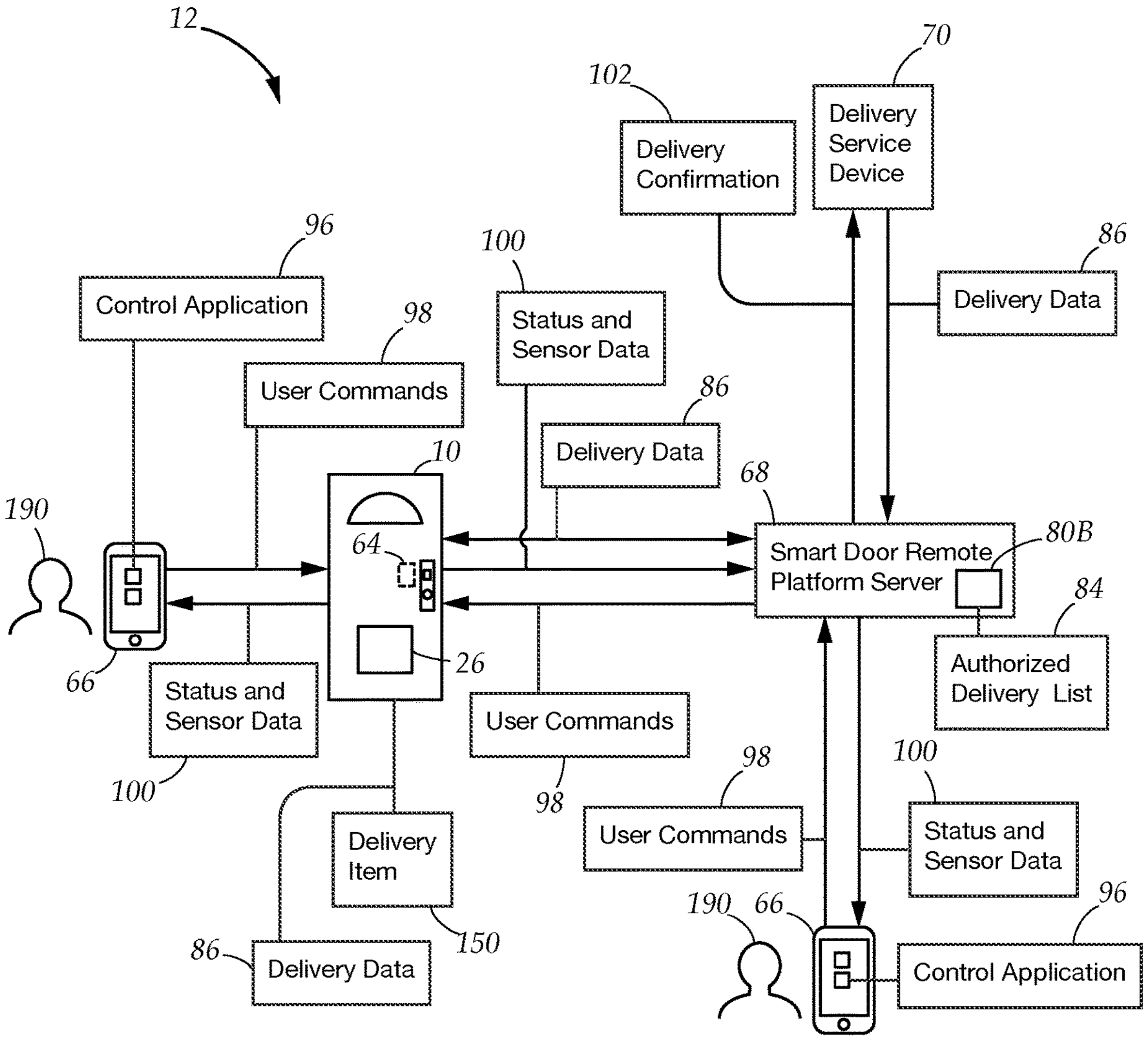
FIG. 5B is a block diagram showing the interaction between the smart door, a user device, and a remote platform server, in accordance with an embodiment in the present disclosure.

Referring to FIGS. 1B and FIGS. 5A-B, the user device 66 may be a computing device such as a smartphone, tablet, personal computer, or other suitable device capable of accessing the communication network 72 and displaying a graphical user interface. The user device 66 may also be adapted to execute a control application 96 for providing the user 190 with a variety of user commands 98 for controlling the smart door 10. In a preferred embodiment, the user device 66 may communicate with the control module 64 of the smart door 10 either directly via wireless RF communications protocols, or via the remote platform server 68. The remote platform server 68 may be implemented using any computing device suitable for executing remote applications and which is adapted to communicate with the control module 64 as well as the user device 66. Thus, when the user device 66 is unable to directly communicate with the control module 64, the remote platform server 68 may allow the user commands 98 to be relayed from the user device 66 to the smart door 10 via the communication network 72.

Figure 5C:
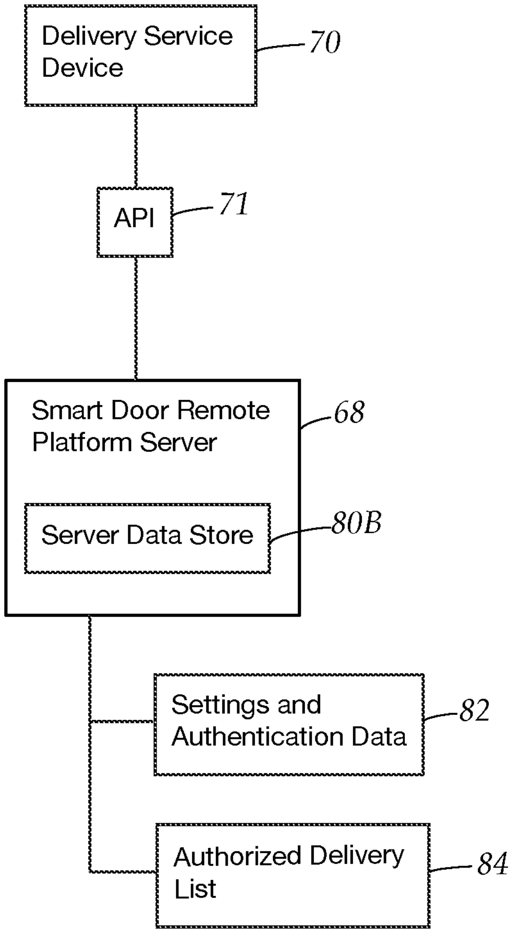
FIG. 5C is a block diagram showing a remote platform server, in accordance with an embodiment in the present disclosure.
Figure 6:
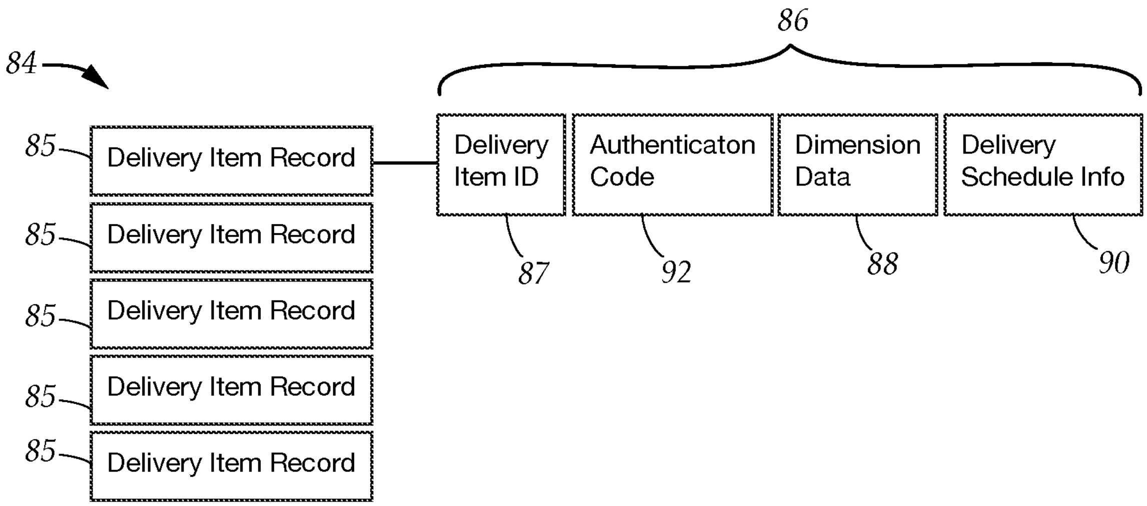
FIG. 6 is a block diagram showing an authorized delivery list detailing delivery items which are pre-authorized to pass through the access opening, in accordance with an embodiment in the present disclosure.

Turning to FIG. 5C while continuing to refer to FIGS. 1B and FIGS. 5A-B, the remote platform server 68 is further adapted to allow the smart door control system 12 to communicate with the delivery service device 70 via a delivery "API" 71 or application program interface. The delivery service device 70 may be any computing device or server operated by the delivery service. For example, the delivery service device 70 may be a computing device hosting an ecommerce platform. In a preferred embodiment, the delivery API 71 allows the delivery service device 70 to transmit delivery data 86 to the smart door control system 12 via the remote platform server 68. The delivery data 86 may also be forwarded to the control module 64 of the smart door 10. Referring to FIG. 6 along with FIG. 4, the delivery data 86 may comprise a delivery item ID 87 such as a tracking number or other identifier associated with the delivery item 150, and dimension data 88 which details the size of the delivery item 150, such as the delivery item height 150H. The delivery data 86 may further comprise an authentication code 92, as well as delivery schedule info 90 indicating the date and/or time upon with the delivery item 150 is expected to be delivered. Returning to FIG. 5B while also referring to FIGS. 5A, 5C, and FIG. 6, the delivery data 86 may be stored within a localized data store 80 implemented on the storage device 78 of the control module 64 and/or a server data store 80B maintained by the remote platform server 68. In one embodiment, the localized data store 80 and/or the server data store 80B may maintain an authorized delivery list 84 comprising a plurality of delivery item records 85, with each delivery item record 85 containing the delivery data 86 for one authorized item.

Referring to FIG. 4 while also referring to FIGS. 5A-B and FIG. 6, in a preferred embodiment, the delivery item 150 may have an information tag 152 or other identification marker which contains the delivery data 86 in a machine-readable form, and is adapted to be scanned and read by the scanning device 58 of the smart door 10. The scanning device 58 may utilize a single sensing device, or may comprise a plurality of different sensing devices. The scanning device 58 may be an optical scanner or other similar device adapted to read visually encoded data such as barcodes, QR codes, and other formats as will be apparent to a person of ordinary skill in the art in the field of the invention. In certain embodiments, the delivery item 150 may have an RFID (radio frequency identification) tag 152R which contains the delivery data 86, and the scanning device 58 may be adapted to function as an RFID reader configured to wirelessly read the delivery data 86 within the RFID tag 152R. Note that other wireless communication technologies may be employed in place of RFID, as will be apparent to a person of ordinary skill in the art in the field of the invention. In certain embodiments, the scanning device 58 may incorporate a dimensional scanner adapted to inspect the delivery item 150 and determine the physical dimensions of the delivery item 150, including the delivery item height 150H.

Figure 7:
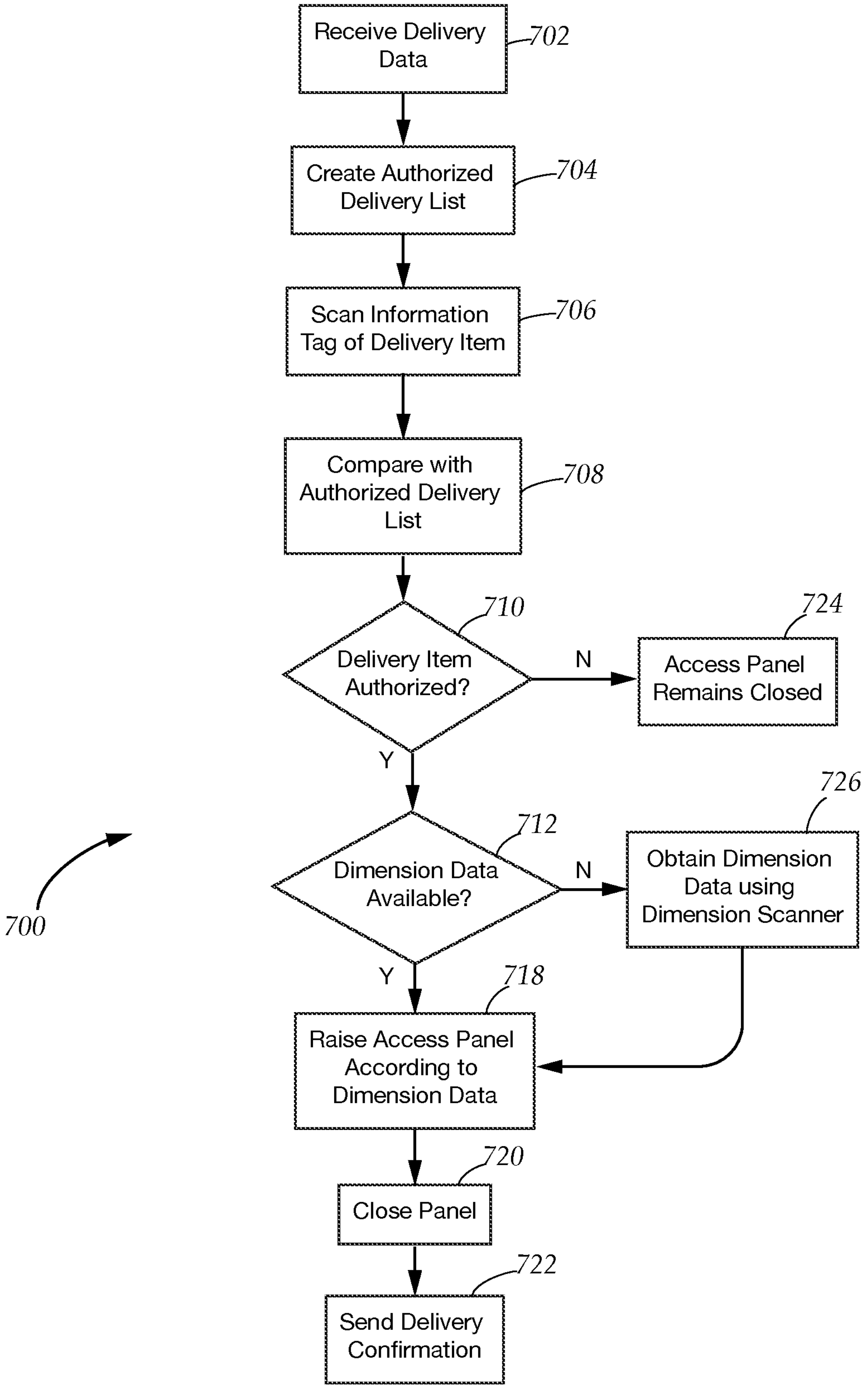
FIG. 7 is a process flowchart showing an exemplary access panel control process, in accordance with an embodiment in the present disclosure.

Turning now to FIG. 7 while continuing to refer to FIGS. 4, FIGS. 5A-B and FIG. 6, an exemplary access panel control process 700 is shown. At step 702, the delivery service device 70 transmits delivery data 86 to the smart door control system 12. At step 704, the delivery data 86 is received by the remote platform server 68, and the authorized delivery list 84 is either created or updated as appropriate. The remote platform server 68 may also transmit the delivery data 86 to the control module of the smart door 10, and may further allow instances of the authorized delivery list to be maintained on the server data store 80B as well as the local data store 80 of the control module 64.

At step 706, the delivery item 150 may be carried to the smart door 10 by a courier 180 or other person, thus allowing the delivery item 150 to be presented to the scanning device 58. To initiate scanning of the delivery item 150 by the scanning device 58, the courier 180 may position the delivery item 150 within operable scanning distance of the scanning device 58 to allow the smart door to read the delivery data 86 associated with the delivery item 150 to obtain the delivery item ID 87. Scanning may also be initiated by pressing the activation switch 59, or via a command inputted via the access input device 52. At step 708, the smart door control system 12 initiates a comparison of the scanned delivery item ID with the authorized delivery list 84. The delivery item 150 will be confirmed as authorized if its delivery item ID matches the delivery item ID 87 associated with one of the authorized items in the authorized delivery list 84. In a preferred embodiment, the comparison between the delivery item ID 87 of the scanned delivery item 150 with the authorized delivery list 84 may be performed locally by the control module 64, or remotely by the remote platform server 68. Where the comparison is performed by the remote platform server 68, the scanned delivery item ID 87 is transmitted by the control module 64 to the remote server platform. In certain embodiments, the information tag 152 (or RFID tag 152R) of the delivery item 150 may display or contain an authorization code 92, which may be compared with the authorization code 92 contained within the matching delivery item record 85 in order for the delivery item 150 to be confirmed as authorized, thus providing additional security.

At step 710, if the scanned delivery item is confirmed to be authorized, the process proceeds to step 712 whereupon the smart door control system 12 will determine if the dimension data 88 of the delivery item 150 is available. However, if the delivery item ID 87 of the scanned delivery item 150 does not correspond to any of the delivery item records within the authorized delivery list 84, the process proceeds to step 724 and the access panel 26 remains in the closed position. Returning to step 712, in one embodiment, the delivery item height 150H may be retrieved from the dimension data 88 contained within the delivery data 86 associated with the scanned delivery item 150. In an alternate embodiment, the delivery item height 150H may instead be obtained by using the scanning device 58 at step 726 if the dimension data 88 is not contained within the delivery item record 85. The dimension data 88 of the delivery item 150 may also be contained within the information tag 152, thus allowing the delivery item height 150H to be obtained directly as the information tag 152 is read. Referring to FIG. 3C while continuing to refer to FIG. 4, FIG. 5A-B, FIG. 6, and FIG. 7, once the scanned delivery item 150 is determined by the smart door 10 to be authorized and the delivery item height 150H is determined, the access panel 26 is raised to reveal the access opening 32. The access panel 26 is raised until the access opening 32 is sufficiently high to accommodate the delivery item height 150H, thus allowing the courier 180 to pass the delivery item 150 through the access opening 32 and into the interior space.

Once the delivery item 150 has passed through the access opening 32, the access panel 26 may be automatically lowered to cover the access opening 32 at step 720. The access panel sensors 38 may be used to first ensure that the access opening 32 is not obstructed by the delivery item 150 or another object prior to the lowering of the access panel 26, while the interior camera 54B may be employed to detect intrusion or other unauthorized activity which may occur prior to the access panel 26 returning to the closed position. Next, a delivery confirmation 102 may be transmitted to the delivery service device 70 indicating that the delivery item 150 has been successfully delivered. The delivery confirmation 102 may also be transmitted to the user via the user device 66.

Note that the steps within the exemplary access panel control process 700 may be varied and/or omitted, while remaining in accordance with the principles of the present disclosure. For example, in certain embodiments, the smart door control system 12 may operate without the remote platform server. User commands 98 and delivery data 86 may be transmitted directly to the control module 64 of the smart door 10. In another embodiment, the delivery item 150 may be confirmed as authorized only if delivery occurs during the date/and or time specified in the delivery schedule information 90. In one embodiment, the access panel 26 may be configured to operate in a manual mode which disables the automatic operation of the access panel. Instead, the user device 66 may be configured to alert the user upon the delivery item 150 being scanned and confirmed as an authorized item, thus allowing the user to manually raise the access panel 26 to permit the delivery item 150 to pass through the access opening 32.

Figure 8:
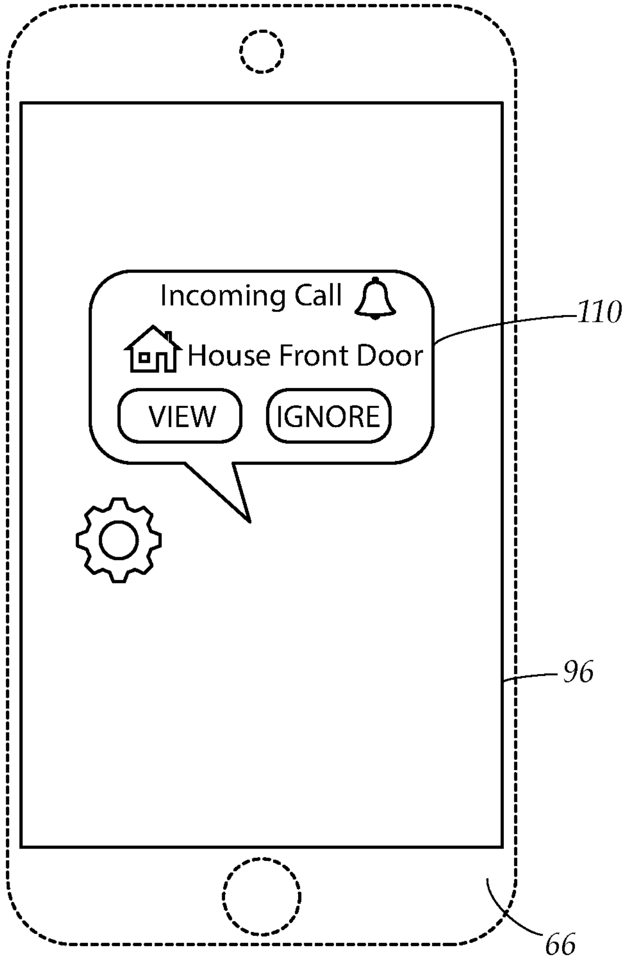
FIG. 8 is a diagrammatical front view of a user device showing a video call notification, in accordance with an embodiment in the present disclosure.
Figure 9:
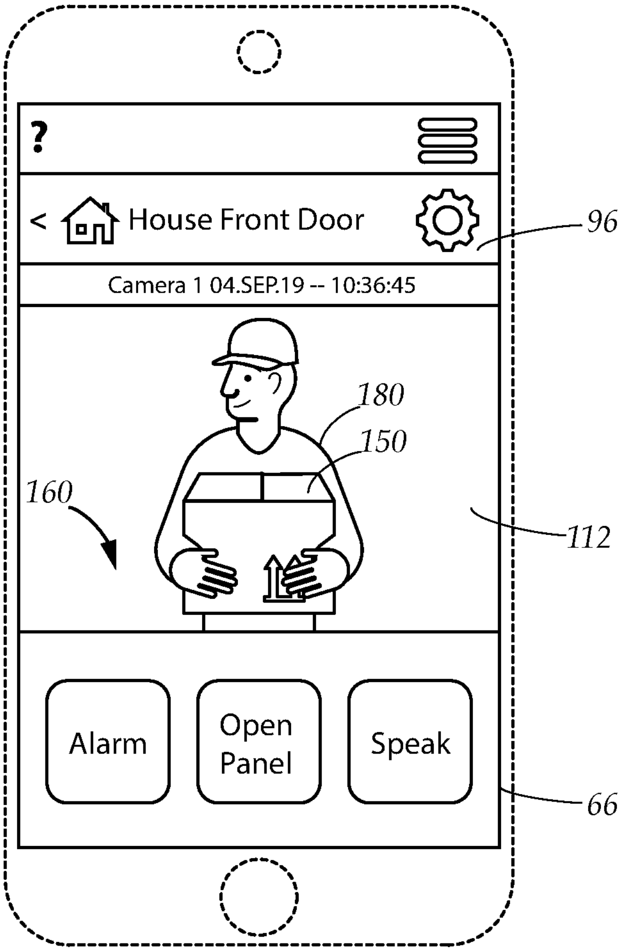
FIG. 9 is a diagrammatical front view of the user device showing a video feed captured from an exterior camera, in accordance with an embodiment in the present disclosure.

Turning to FIG. 8 while also referring to FIG. 1A, FIG. 4, and FIG. 5B, the control module 64 of the smart door is adapted to transmit video obtained from the exterior camera 54, inputs from the access input device 52, as well as sensor data from the access panel sensors 38, to the user device 66 and the remote platform server 68 in the form of status and sensor data 100. Furthermore, the user device 66 may be configured to display a panel access alert upon the access panel 26 being raised, as well as a panel blockage alert upon the access panel sensors 38 detecting the presence of a blockage which prevents the access panel 26 from returning to the closed position. The smart door 10 may allow a video call to be conducted by transmitting the video from the exterior camera 54 to the user device 66. In one embodiment, the control application 96 may display a call notification 110 to alert the user of an incoming video call. A video call may also be initiated automatically when a caller, such as the courier 180 or another person, enters within the field of view of the external camera 54, or if the activation switch 59 is pressed. The external camera 54 may be paired with a motion sensing device to trigger a video call, or other form of video recording. Turning to FIG. 9 while also referring to FIG. 1A and FIG. 4, if the user accepts the video call, the control application 96 may display the video 112 from the external camera 54. The user may also speak to the caller via the speaker 56, while the caller may speak to the user via the microphone of the smart door 10, thus allowing the user to instruct the courier 180 to leave the delivery item 150 in front of the smart door 10. The smart door 10 thus allows the user to identify the person visible to the exterior camera 54, and the user may further manually raise the access panel 26 if so desired.

Referring to FIGS. 1A, FIG. 3C, in certain embodiments, the exterior camera 54 and the interior camera 54B may be configured to automatically activate and record video when the access panel 26 is raised. The interior camera 54B is oriented downwardly towards the access opening 32, and is configured to create a video record of the delivery item 150 (or other object) passing through the access opening 32. Referring to FIGS. 5A-B, the video record may be stored using the storage device 78 of the control module 64 or the remote platform server 68, and is viewable using the user device 66.

Figure 10:
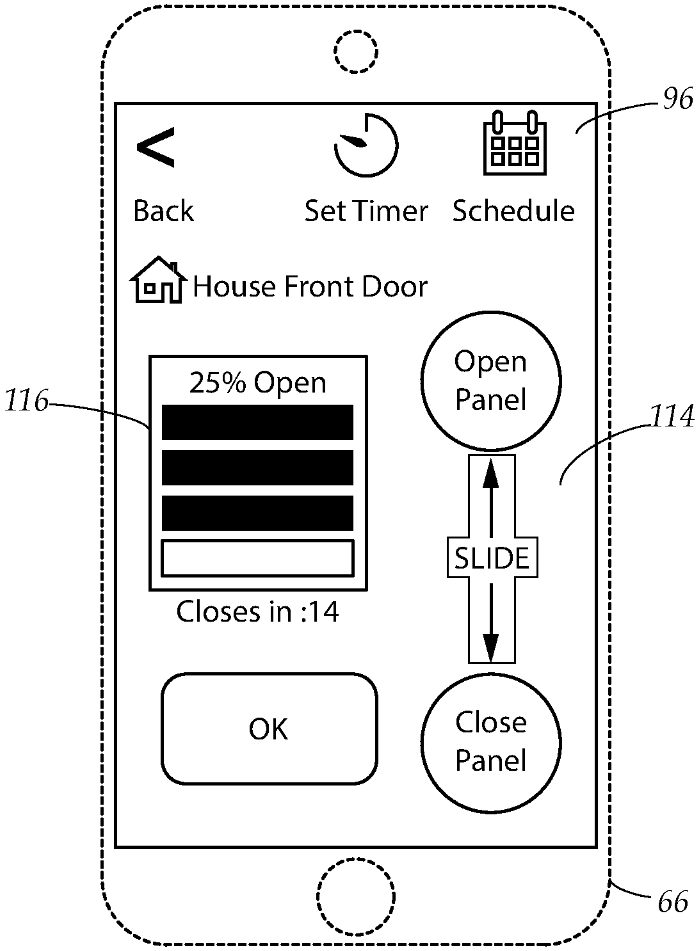
FIG. 10 is a diagrammatical front view of the user device, showing an access panel control interface, in accordance with an embodiment in the present disclosure.

Referring now to FIG. 10 while also referring to FIG. 1A, FIG. 4, FIG. 5B, and FIG. 9, the control application 96 may also allow the user to transmit user commands 98 to manually raise or lower the access panel 26 via an access panel control interface 114 implemented on the user device 66. The access panel control interface 114 allows the user to raise the access panel 26 and reveal the access opening 32, and may further allow the user to incrementally increase or decrease the opening height 36 using an access opening adjustment control 116.

Figure 3E:
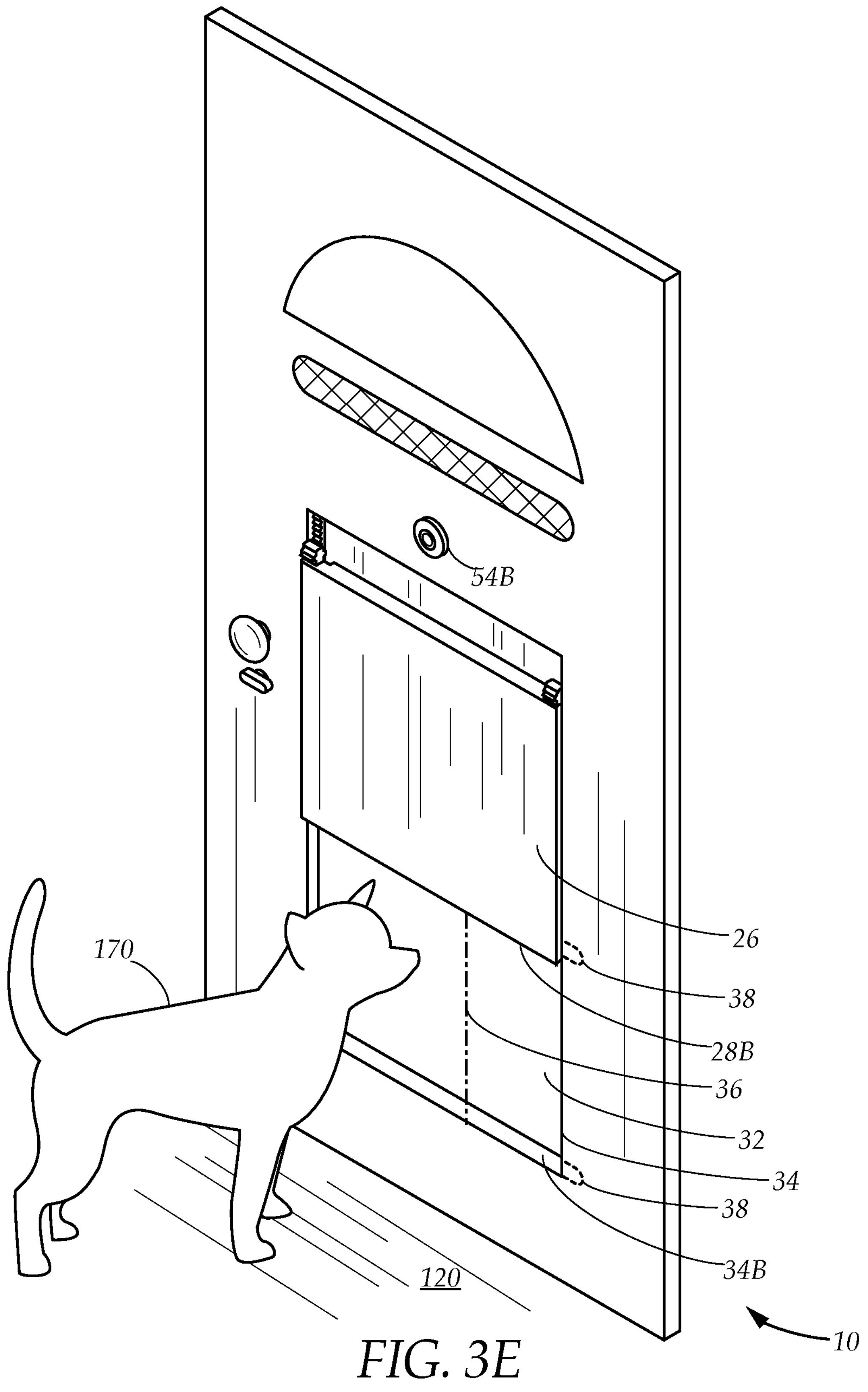
FIG. 3E is a is a diagrammatical perspective view of the smart door, showing the access panel raised sufficiently to allow a pet animal to pass through the access opening, in accordance with an embodiment in the present disclosure.

Turning to FIG. 3E while also referring to FIG. 1A and FIG. 5B, the smart door 10 may also allow a pet animal 170 to pass through the access opening 32. The user may be automatically notified via the user device 66 upon the pet animal entering into the field of view of the external camera 54 and/or the internal camera 54B, whereupon the user may manually raise the access panel 26 to allow the pet animal 170 to pass through the access opening 32. Video of the pet animal 170 may also be transmitted to the user device 66 to allow the user to identify the pet animal. The user may also employ the speaker 56 to emit an audio cue to recall the pet animal 170 to the smart door 10.

Returning to FIG. 1A, FIG. 3C, FIG. 4, and FIG. 5B, the smart door 10 may be adapted to execute additional user commands 98. For example, the user may remotely engage or disengage the lock mechanism 50, set timers regulating how long the access panel 26 will remain in the open position before automatically returning to the closed position, as well as manually transmit an emergency alert to emergency services personnel. The activation switch 59 may also function as a doorbell, causing the speaker 56 to emit an audible signal upon the activation switch 59 being pressed.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a smart door with controllable access panel. The disclosure is illustrated by example in the drawing figures, and throughout the written description. It should be understood that numerous variations are possible, while adhering to the inventive concept. Such variations are contemplated as being a part of the present disclosure.

What is claimed is:

1. A system for controlling passage of a delivery item between an interior space and an exterior space, the interior space and the exterior space are divided by a door, the door has a main panel and an access frame, the access frame forming a void space through the main panel through which the passage can occur, the system comprising:

a movable access panel and a panel actuator, the movable access panel is positioned across the access frame of the door in a closed position which fully blocks the access frame, the panel actuator is adapted to facilitate movement of the movable access panel between the closed position and an open position which creates a gap between the movable access panel and the access frame, the gap corresponding to an access opening, the access opening having a variable opening height; and a control module operably connected to a communication network, the control module is adapted to receive delivery data from a delivery service device via the communication network, the delivery data containing dimension data, the control module is operably linked to the panel actuator and is adapted to cause the panel actuator to move the movable access panel towards the open position while adjusting the variable opening height according to the dimension data, further allowing the passage of the delivery item from the exterior space to the interior space through the access opening.

2. The system as described in claim 1, further comprising:

an information tag adapted to be placed on the delivery item, the information tag having a delivery item identifier;

a scanning device adapted to scan the information tag and obtain the delivery item identifier; and wherein the control module is adapted to reference the dimension data using the delivery item identifier.

3. The system as described in claim 2, wherein:

the control module is further adapted to compare the delivery item identifier against an authorized delivery list which identifies one or more authorized items, the control module causes the movable access panel to enter the open position upon verifying the delivery item matches one of the authorized items.

4. The system as described in claim 3, further comprising:

a user device operably connected to the control module via the communication network, the user device allows a user to transmit user commands to selectively reveal or cover the access opening, the user device is further adapted to display a panel access alert upon the access panel being placed in the open position.

5. The system as described in claim 4, further comprising:

an exterior camera adapted to capture video of the external space, and an interior camera positioned above the access opening and oriented downwardly, the interior camera is adapted to activate when the access panel is placed in the open position and is further adapted to create a video record of the delivery item passing through the access opening; and a remote platform server operably connected to the control module and the user device, the remote platform server is adapted to relay the user commands to the control module when the user device is remotely disposed in relation to the smart door, the remote platform server is further adapted to receive the delivery data from the delivery service device and relay the delivery data to the control module.

6. The system as described in claim 5, wherein:

the access panel is oriented parallel to the main panel of the smart door, and is adapted to vertically raise and lower between the open and the closed positions; and the system further comprises an access panel sensor adapted to detect an obstruction preventing the access panel from lowering to the closed position, and the control module is adapted to prevent the access panel from lowering to the closed position upon the obstruction being detected, and the user device is adapted to display a panel blockage alert.

7. The system as described in claim 6, wherein:

the delivery item identifier is stored in optical machine readable format on the information tag, and the scanning device is an optical scanner adapted to read the delivery item identifier.

8. A method for securely delivering a delivery item between an interior space and an exterior space, the interior space and the exterior space are divided by a door, the door has a main panel and an access frame, the access frame forming a void space through the main panel through which the passage can occur, the method comprising the steps of:

providing a movable access panel and a panel actuator, the movable access panel is positioned across the access frame in a closed position which blocks the passage from the exterior space to the interior space;

providing a control module operably connected to a communication network and the panel actuator, the control module is adapted to communicate with a delivery service device;

the control module receiving delivery data from the delivery service device via the communication network;

reading dimension data from within the delivery data;

placing the access panel in an open position using the panel actuator, the open position creating an access opening having a variable opening height; and adjusting the variable opening height of the access opening according to the dimension data, and allowing the passage of the delivery item from the exterior space to the interior space through the access opening.

9. The method as recited in claim 8, wherein:

the step of providing the control module is followed by the step of providing a scanning device operably linked to the control module;

the step of the control module receiving delivery data is followed by the step of scanning an information tag upon the delivery item and obtaining a delivery item identifier associated with the delivery item; and the step of reading dimension data further comprises referencing the dimension data within the delivery data using the delivery item identifier.

10. The method as recited in claim 9, wherein:

the step of the scanning an information tag is followed by the step of referencing the delivery item identifier against an authorized delivery list and allowing the access panel to open upon verifying the delivery item is authorized.

11. The method as recited in claim 10, wherein:

the step of providing a scanning device is followed by the step of providing a control application configured on a user device;

the step of placing the access panel in an open position is followed by the step of displaying a panel access alert via the control application; and the step of adjusting the variable opening height is followed by the step of inputting user commands via the control application to manually reveal or block the access opening.

12. The method as recited in claim 11, wherein:

the step of providing a control application is followed by the step of providing a remote platform server adapted to communicate with the control module via the communication network; and the step of inputting user commands via the control application is followed by the step of relaying the user commands to the control module from the user device when the user device is remotely disposed in relation to the control module.

13. The method as recited in claim 12, wherein:

the step of placing the access panel in an open position further comprises vertically raising the access panel relative to the main panel; and the step of adjusting the variable opening height is followed by the step of automatically lowering the access panel towards the closed position.

14. The method as recited in claim 13, wherein:

the step of providing a movable access panel further comprises providing an access panel sensor; and the step of automatically lowering the access panel towards the closed position further comprises detecting an obstruction preventing the access panel from lowering to the closed position by the access panel sensor, and displaying a panel blockage alert via the control application.

15. The method as recited in claim 14, wherein:

the step of providing a movable access panel further comprises providing an interior camera oriented towards the access panel; and the step of placing the access panel in an open position is followed by the step of capturing video by the interior camera and creating a video record of the delivery item passing through the access opening into the interior space.

* * * * *